Figure 1:
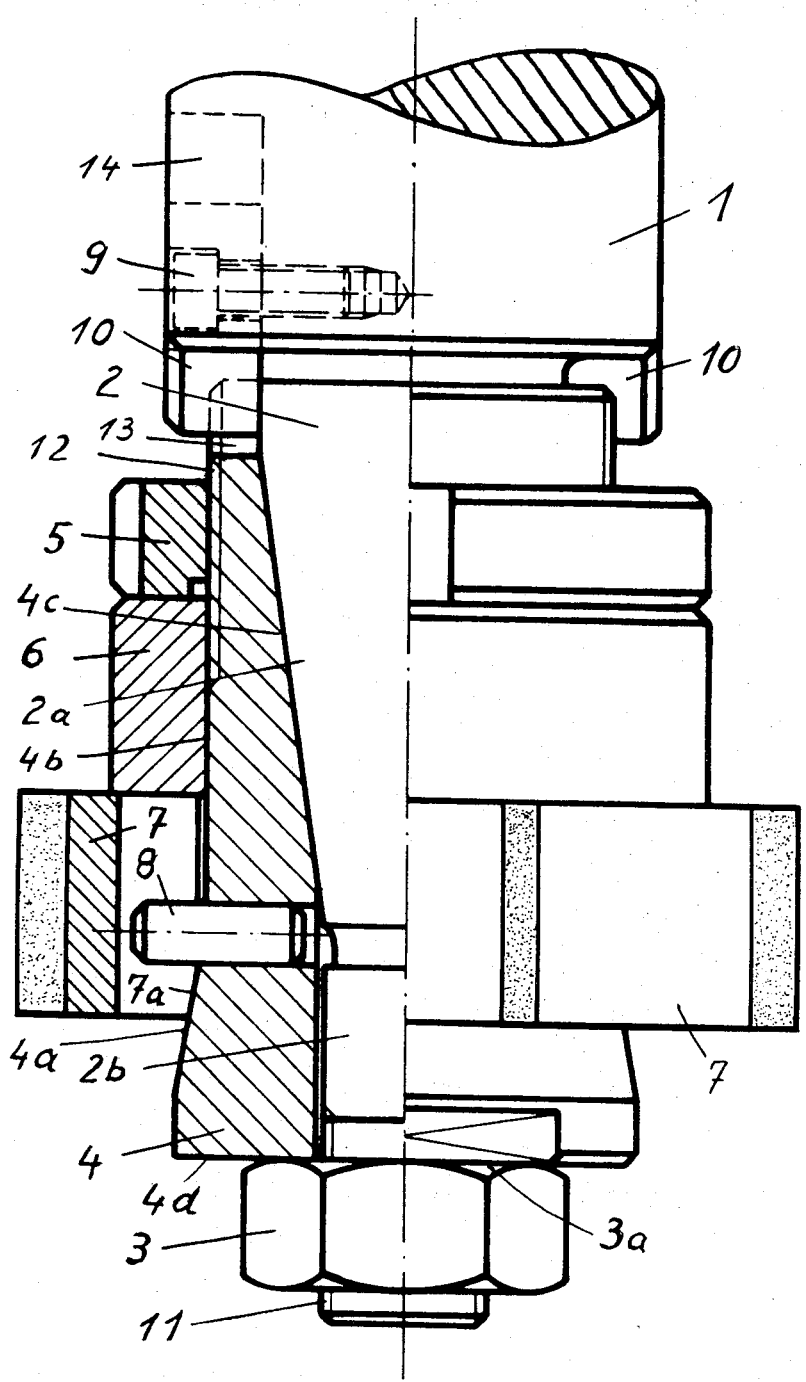

United States Patent [19]
Merz

[11] 3,764,224
[45] Oct. 9, 1973

[54] ADJUSTABLE CHUCKING REAMER
[75] Inventor: Adolf Merz, Olten, Switzerland
[73] Assignee: Merz AG Dulliken, Dulliken, Switzerland
[22] Filed: Dec. 14, 1971
[21] Appl. No.: 207,748

[30] Foreign Application Priority Data
Dec. 16, 1970  Switzerland.................. 18626/70

[52] U.S. Cl................ 408/231, 279/1 R, 279/2, 408/239
[51] Int. Cl................ B23b 31/02, B23d 77/08
[58] Field of Search.............. 408/231, 233, 238, 408/239, 232, 199; 279/1 R, 1 A, 2; 83/666

[56] References Cited
UNITED STATES PATENTS
| | | | |
|---|---|---|---|
| 1,472,565 | 10/1923 | Manning | 279/1 R |
| 1,337,313 | 4/1920 | Groene | 279/1 R |
| 2,361,324 | 10/1944 | Severson | 279/1 R X |
| 3,554,080 | 1/1971 | Herrmann | 408/238 X |
| 1,347,740 | 7/1920 | Hack | 279/2 X |

*Primary Examiner*—Andrew R. Juhasz
*Assistant Examiner*—James F. Coan
*Attorney*—William J. Daniel

[57] ABSTRACT

The invention relates to an adjustable chucking reamer having a reamer shank and an interchangeable, sleeve-like reamer head which is continuously corrugated in cross-section and is provided with cutting edges arranged at shoulders formed by radial projections at the reamer head, and which is fixed resiliently about a conical expansion member between the said expansion member and a displaceably arranged sleeve supported on a nut, and is adapted to be radially expanded by axial displacement relatively to the expansion member, and which is supported on the expansion member only with a front conical portion of its internal corrugation crests.

7 Claims, 2 Drawing Figures

ADJUSTABLE CHUCKING REAMER

A chucking reamer of this kind is known from the Swiss patent No: 275,208 and is described there as one of two constructional variants of adjustable chucking reamers of the type specified hereinbefore, which are equivalent in principle. The two constructional variants differ substantially only in that in a first constructional variant a reamer head is arranged between a flange on the reamer shank and an expansion member which is provided with a screwthreaded bore and is screwed on to a screw-threaded stud on the front end of the reamer shank, and in the second constructional variant is arranged between an expansion member forming the front end of the reamer shank and a flanged sleeve which is displaceable on the shank and is supported on a nut screwed on to the shank. Thus in the first constructional variant the reamer head abuts at its rear securely against a flange on the reamer shank and can be adjusted by screwing the expansion member, projecting forwardly into the head, more or less far on to the screwthreaded stud on the reamer shank. In the second constructional variant, in contrast, the reamer head abuts securely on the expansion member, projecting from the front into it and forming the front end of the reamer shank, and can be adjusted by displacement of a flanged sleeve abutting on its rear or by rotation of a nut which forms the support for the flanged sleeve and is screwed on to the shank. Since in the first constructional variant the reamer head abuts at the rear securely against the reamer shank and in the second constructional variant abuts at the front securely against the reamer shank or the expansion member forming the front end thereof, on assembly of the reamer in the first constructional variant the reamer head can be applied from the front on to the reamer shank or the screwthreaded stud at the front end of the reamer shank, whereas in the second constructional variant the reamer head has to be pushed from the rear over the entire shank on assembly of the reamer, and then the flanged sleeve if fitted on and then the nut provided for supporting the sleeve is screwed on to the shank. As a result, the second constructional variant can be used substantially only for constructional forms of chucking reamers wherein the internal opening width of the reamer head, which is in the manner of an annular sleeve, is larger than the largest diameter of the reamer shank in the region between the rear end of the reamer shank and the expansion member arranged at its front end, whereas in contrast the only requirement for the first constructional variant is that the external diameter of the reamer head is larger than the largest diameter of the reamer shank. Thus the second constructional variant was useful only for relatively large reamer diameters, whereas in the case of relatively small and medium-size reamer diameters the first constructional variant had to be used.

But the first constructional variant as compared with the second constructional variant does not afford such high standards of precision as regards out-of-true running of the reamer head, since an expansion member screwed on to a screwthreaded stud does not, even if the screw threads of the screwthreaded bore in the expansion member and of the screwthreaded stud on the reamer shank are ground, permit as accurate centering as an expansion member connected integrally with the reamer shank in accordance with the second constructional variant, and since furthermore in the case of an expansion member screwed on to a screwthreaded stud it is possible for the longitudinal axis of the expansion member and the longitudinal axis of the reamer shank, or the screwthreaded stud on the reamer shank, not to be aligned precisely in relation with one another, for example since the distribution of the pressure points between the internal screwthread in the expansion member and the external screwthread on the screwthreaded stud is not absolutely uniform in the peripheral direction.

In the course of the ever-developing automation of industrial production, however, the standards expected as regards the maximum permissable out-of-true running of chucking reamers are always being raised, more particularly in the range of small and medium reamer diameters, for which hitherto only the first constructional variant could be considered, for the reasons mentioned hereinbefore. It would in fact theoretically be possible to take these increased requirements into account by changing-over to the second constructional variant in the range of small and medium reamer diameters also. But this would require that the shank diameters would have to be considerably reduced in order to permit the second constructional variant to be used with small and medium reamer diameters. But the obstacle is that first for reasons of strength and stability and secondly because of the consequent necessity to re-equip the machines in industry for suitably smaller-sized holders for the reamer shanks, such reduction in shank diameters cannot be considered.

A further point is that if the shank diameter is too small there is a risk that oscillations of the reamer head transversely to its axial direction occur during operation, and these have the same effect as inadequate precision as regards eccentricity in rotational movement, and thus, with the specific given standard of precision as regards out-of-true running the requirements as regards static out-of-true precision (in idle running, where no such transverse oscillations occur) may be substantially increased. Under unfavourable circumstances, i.e. with excessively small shank diameter and at the same time relatively considerable shank length, it may even happen that the transverse oscillations of the reamer head during operation may have a larger amplitude than the maximum permissible amount of out-of-true.

Therefore, the object of the invention was to provide an adjustable chucking reamer which on the one hand has the advantages of the second aforesaid constructional variant as regards precise centring and alignment of the longitudinal axis of the expansion member and the longitudinal axis of the reamer shank with one another, and therefore the attainable very slight degree of out-of-true running, but on the other hand does not, like the said second constructional variant, require that the reamer head has to be fitted from the rear over the entire reamer shank or that the internal opening width of the reamer head has to be larger than the shank diameter at its largest region.

According to the invention this is acheived with a chucking reamer of the type initially specified which is characterised by a tubular member which is adapted to be placed on an extension at the front end of the reamer shank and is capable of being secured thereto, the said member widening conically in one end region and forming with this region the expansion member, being cylindrical in a central region and forming with this region a guide for the displaceable arrangement of the sleeve and in its other end region is provided with a screwthread for the nut provided for supporting the sleeve, and also by a reamer shank diameter which is between the internal diameter of the nut and the external diameter of the reamer head.

Advantageously, to obtain the aforesaid precise centring and alignment of the longitudinal axis of the expansion member and the longitudinal axis of the reamer shank with one another, either the extension can be made conical over a portion of its length and the tubular member has an at least partly conical opening of the same conicity as that of the extension, or an annular face-ground bearing contact surface can be provided at each of the rear end of the tubular member and the reamer shank for the alignment of the longitudinal axes of the tubular member and reamer shank with one another and furthermore axial centring can be provided with a ground centring bore in the tubular member and the centring cylinder, fitting into the centring bore, on the extension of the reamer shank. Both with the one and the other of these two constructional forms it is possible to effect precise centring and alignment of the longitudinal axis of the expansion member and the longitudinal axis of the reamer shank with one another, the first-mentioned constructional form having the special advantage of a somewhat reduced technical outlay and somewhat simpler handling when releasing the tubular member from the reamer shank, and the last-mentioned constructional form having the special advantage of a somewhat higher standard of precision as regards centring and alignment of the longitudinal axes of expansion member and reamer shank with one another. In the first constructional form the conical parts of the extension and the opening can conveniently be ground and constructed as a centring cone and a conical centring bore respectively.

To secure the tubular member on the extension, the extension can advantageously be provided at the front with a screwthread, the tubular member being placed on the extension and secured thereto with a securing nut screwed on to the screwthread on the extension.

It is also possible advantageously for the purpose of transmitting torque from the reamer shank to the tubular member, to provide connecting means between reamer shank and tubular member for connecting the two parts to be fast in rotation with one another, and these connecting means can conveniently be wedges engaging in recesses in the two parts.

Figure 2:
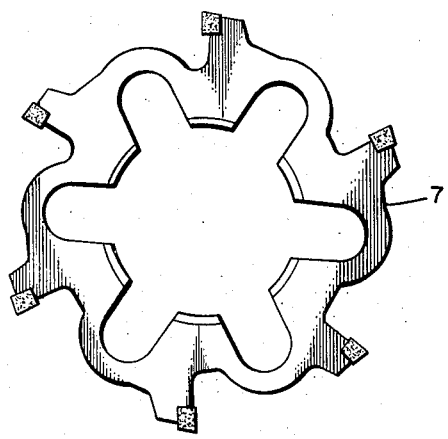

The invention will be explained in detail with reference to a constructional example with the help of the the accompanying drawings in which FIG. 1 is an assembly view partially cut away to reveal certain internal details, and FIG. 2 is a top plan view of the reamer head alone, i.e., removed from the remainder of the assembly of FIG. 1, showing the internal corrugations thereof.

The chucking reamer shown in the drawing comprises a reamer shank 1 with an extension 2 at its front end, a tubular member 4 placed on the extension 2 and secured thereto with the securing nut 3, the nut 5, the sleeve 6 and the reamer head 7, which are placed on the tubular member 4, the entrainment pin 8 for connecting the reamer head 7 and tubular member 4 to be fast in rotation with one another, and the wedges 10 secured with screws 9 to the reamer shank 1 for connecting the reamer shank 1 and tubular member 4 so as to be fast in rotation with one another.

The extension 2 at the front end of the reamer shank 1 is of conical shape over a portion 2a of its length and comprises at the front a cylindrical portion 2b which is provided with a screwthread 11. The securing nut 3 provided for securing the tubular member 4 on the extension 2 is screwed on the screwthread 11.

The tubular member 4 widens conically at its front end region 4a and forms, with this region 4a, the expansion member. In the central region 4b the tubular member 4 is cylindrical and, with this region 4b, constitutes the guide for the displaceable arrangement of the sleeve 6. At its rear end region the tubular member 4 is provided with the screwthread 12 for the nut 5, provided for supporting the sleeve 6.

To assemble the reamer, first of all the entrainment pin 8 is inserted in the tubular member 4, in the hole provided for the purpose, and then the reamer head 7 is so placed on the member 4 that it bears with the front conical portion 7a of its internal corrugation crests on the conical region 4a of the tubular member 4, which conical region forms the expansion member. Then the sleeve 6 is fitted on to the tubular member 4, and then the nut 5 is screwed on to the screwthread 12 in the rear end region of the tubular member 4. Then the tubular member 4 is placed with the nut 5, the sleeve 6 and the reamer head 7 on the conical extension 2 at the front end of the reamer shank 1 and so aligned by rotation relatively to the reamer shank 1 that the recesses 13 at the rear end of the tubular member 4 and the recesses 14 in the reamer shank 1 are situated opposite one another. Then the wedges 10 are inserted in these recesses 13 and 14 for making the reamer shank 1 and tubular member 4 rotationally integral with one another, and are secured to the reamer shank 1 with screws 9. Then the securing nut 3 is tightened and as a result the conical portion 4c of the opening in the tubular member 4 is pressed on to the conical portion 2a of the extension 2. If the conical portion 4c of the opening in the tubular member 4 comprises exactly the same conicity as the conical portion 2a of the extension 2 and furthermore both the cone axis of the conical portion 4c of the opening in the tubular member 4 coincides exactly with the longitudinal axis of the tubular member 4 and also the cone axis if the conical portion 2a of the extension 2 coincides exactly with the longitudinal axis of the reamer shank 1, and if furthermore the surface roughness of the conical portion 4c and the conical portion 2a is so slight that a completely uniform distribution of pressure points is obtained between this conical portion 4 c and the conical portion 2a over the entire cone surface, then when the securing nut 3 is tightened a precise centring is achieved, and also a precise alignment of the longitudinal axis of the tubular member 4, whose region 4a forms the expansion member, and the longitudinal axis of the reamer shank 1.

After the tightening of the securing nut 3, the nut 5 is then tightenend and this may be screwed forwards until the reamer head 7 is expanded to the desired extent. Then, to re-adjust the reamer, the nut 5 in each case is simply to be turned so that a further widening of the forward conical portion 7a of the inner corrugation crests of the reamer head 7 is brought about, and therefore an appropriate enlargement of the external diameter of the reamer head 7 at its front end.

In the construction of the present chucking reamer the following points should be taken into consideration: First of all, it must be insured that the cone axes of the conical portion 4c of the opening in the tubular member 4 and the conical region 4a at the front end of the tubular member 4 coincide precisely with the longitudinal axis of the tubular member 4 and more particularly the cylinder axis of the central cylindrical region 4b of the tubular member 4 i.e., when manufacturing the tubular member 4 it must be insured that when grinding the surfaces 4a, 4b and 4c the member 4 rotates precisely about the same axis. Therefore, it is expedient to carry out the final machining of the surfaces 4a, 4b and 4c of the tubular member 4 in the same chucking. Secondly, care must be taken to ensure that the front end surface 4d of the tubular member 4 is situated as precisely as possible in a plane to which the longitudinal axis of the member 4 is perpendicular. The latter is important in order that the bearing pressure of the securing nut 3 of this surface 4d should be as uniformly distributed as possible over the entire bearing surface and more particularly the securing nut is prevented from bearing only at one side on the surface 4d or exerting a substantially greater pressure at one side than at the opposite side of this surface 4d. For the same reason it must also be ensured that at least the end surface 3a of the securing nut 3 is situated as precisely as possible in a plane to which the longitudinal axis of the nut 3 is perpendicular. Finally, for the same reason it is advisable to provide both the securing nut 3 with a ground internal screwthread and also to provide the extension 2 with a ground external screwthread 11. The aforesaid uniform pressure distribution of the bearing pressure of the securing nut 3 on the front end surface 4d of the tubular member 4 is desirable in order to obtain a uniform distribution of the pressure points between the conical portion 4c and the conical portion 2a, since only this guarantees precise centring and precise alignment of the longitudinal axes of the reamer shank 1 and tubular member 4 with one another. Thirdly, in the manufacture of the reamer shank, care must be taken to ensure that the cone axis of the conical portion 2a of the extension 2 coincides precisely with the longitudinal axis of the reamer shank i.e., it must be ensured that when grinding this conical surface the reamer shank 1 rotates precisely about its longitudinal axis. Fourthly, it must be ensured that the conicity of the conical portion 4c of the opening in the tubular member 4 and the conicity of the conical portion 2a of the extension 2 coincide precisely, and fifthly, finally, care must be taken that there is an extremely small amount of surface roughness both on the conical portion 4c and the conical portion 2a. Furthermore, the fit between the cylindrical portion 4b and the bore in the sleeve 6 must be as close as possible, and the length of the sleeve 6 is to be as large as possible.

By making the fit between the sleeve 6 and the cylindrical portion 4b as close as possible, and making the sleeve 6 as long as possible, the longitudinal axis of the reamer head 7, which bears at its rear end of the front side of the sleeve 6, is aligned precisely on the longitudinal axis of the tubular member 4 and therefore of the reamer shank 1. The centring of the reamer head is then effected by the conical region 4a of the tubular member 4, which region forms the expansion member. In order to obtain the most precise alignment possible for the axis of the reamer head 7 with regard to the longitudinal axis of the member 4 or reamer shank 1, the rear side of the reamer head 7 and at least the front side of the sleeve 6 should also be face-ground.

With chucking reamers as proposed by the present invention, shank diameters can be used which correspond approximately to the external diameter of the reamer head, thus giving the greatest possible guarantee against transverse oscillations of the reamer head during operation.

I claim:

1. Adjustable chucking reamer having a reamer shank and an interchangeable tubular reamer head which has a continuously corrugated internal cross-section and is provided with cutting edges which are arranged on shoulders formed by radial projections on the reamer head, said reamer head being resiliently mounted on a conical expansion member carried on said shank and being secured between said expansion member and a sleeve which is displaceably arranged on said member and held in place by an adjustable nut, said reamer head being adapted to be radially expanded by axial displacement on the expansion member and being supported only at a front conical portion of its internal corrugation crests on the expansion member, characterized by a tubular member (4) removably secured to an extension (2) on the front end of the reamer shank (1), said member (4) comprising a conically flared end region (4a) for engaging the reamer head from one side thereof, a cylindrical central region (4b) for supporting said sleeve (6) for said axial displacement, and an opposite end region provided with a screwthread (12) for engagement with the adjustable nut (5), said reamer shank (1) having a diameter intermediate the internal diameter of the nut (5) and the external diameter of the reamer head (7).

2. Chucking reamer according to claim 1 characterized in that the extension (2) is conically shaped over a portion (2a) of its length, and the tubular member (4) has a bore (4c) at least partly conically shaped to mate with the extension (2).

3. Chucking reamer according to claim 2, characterised in that the conical portions (2a, 4c) of said extension and said bore are ground and constructed as a centring cone and a conical centring bore respectively.

4. Chucking reamer according to claim 1, characterised by an annular, face-ground bearing surface on each of the rear end of the tubular member and the reamer shank, for alignment of the longitudinal axis of the tubular member with the longitudinal axis of the reamer shank, and also by an axial centring arrangement constituted by a ground centring bore in the tubular member and a mating centring cylinder on the extension on the reamer shank.

5. Chucking reamer according to claim 1 characterized in that the extension (2) is provided at its outer end with a screwthread (11) and the tubular member (4) is removably secured on said extension with a securing nut (3) screwed on said screwthread (11).

6. Chucking reamer according to claim 1 characterized in that for torque transmission from the reamer shank to the tubular member, connecting means (10) are provided between reamer shank (1) and tubular member (4) for connecting the two parts for unitary rotation.

7. Chucking reamer according to claim 6 characterized in that the connecting means are wedges (10) engaged at opposite ends in recesses (13, 14) in said shank and member (1, 4).

* * * * *